Patented Aug. 1, 1939

2,167,966

UNITED STATES PATENT OFFICE 2,167,966

AROMATIC MERCURY SALTS OF ACETYL-AMINO SUBSTITUTED ACIDS

Carl N. Andersen, Wellesley Hills, Mass., assignor to Lever Brothers Company, a corporation of Maine No Drawing. Application November 17, 1936, Serial No. 111,255

13 Claims. (Cl. 260—434)

The present invention relates to certain new aromatic mercury salts of acetylamino substituted acids.

It is an object of my invention to produce such new organic mercury compounds useful as germicides and for other therapeutic purposes.

I have discovered that when the hydrogen atom of an acidic group or groups in an acetylamino substituted acid is replaced by the essential radical of certain aromatic mercury compounds, compounds are produced which have extraordinarily high potency as antiseptics and germicides and at the same time are characterized by relatively low toxicity and other desirable properties.

The compounds I have produced may be described as having the general formula $(RHg)_x.R_1$, in which R represents an aromatic structure to a carbon atom of which the mercury is directly attached; in which $R_1$ represents an acetylamino substituted acid radical that is linked to the RHg group or groups through the replacement of the hydrogen atom of the acidic group or groups; and in which $x$ represents the number of RHg groups in the compound and is an integer of at least one and not more than the number of acidic hydrogens in the acetylamino substituted acid. While the words "group" and "groups" are used hereinafter, it will be understood that these words must be interpreted as single or plural depending upon the value of $x$.

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for any mono or polycyclic hydrocarbon group in which all of the nuclear carbon atoms, other than the one attached to mercury, and any side chain carbon atoms, have their valences satisfied either by carbon or hydrogen. Examples are the phenyl, diphenyl, tolyl, xylyl and naphthyl groups.

$R_1$ represents the radical of any acetylamino substituted acid, i. e., an acid containing the group —NHCOCH₃ which is substituted for hydrogen. The acids may be either aliphatic or cyclic, saturated or unsaturated, and may be mono or polybasic. The acids may contain one or more substituted acetylamino groups. The cyclic acids may be homo- or heterocyclic, and mono- or polynuclear. In the latter case the acidic group or groups and the acetylamino group or groups may be attached to the same or different nuclei. Saturated or unsaturated side chains may be attached to a cyclic nucleus and the acid radical or acetylamino radical may be attached to either the side chain or the nucleus. Groups other than the acetylamino group may be substituted in the acid, for example, the halogens and the nitro group, along with the acetylamino group. The acidic hydrogen may be contained in any acid radical such as the carboxylic, sulphonics, etc.

The method by which the compounds are prepared, together with the number of compounds I have investigated, shows that all of the acids of the generic group heretofore defined may be employed to produce my novel aromatic mercury salts. The compounds so prepared have in greater or lesser degree, but always in a relatively high degree, antiseptic and germicidal properties. I, therefore, regard my invention as generic to and including the entire group of aromatic mercury salts of acetylamino substituted acids of the above defined type.

The general method of producing these salts consists in reacting together an acetylamino substituted acid and a compound containing an aromatic mercury radical of the above defined type. A liquid reacting medium is employed. The compound resulting from the reaction is usually relatively insoluble as compared with the reacting components and upon its precipitation may be filtered, washed and dried. The aromatic mercury compound I prefer is the hydroxide because in the reaction of the hydroxide with the acid, water is the only other product produced and the resulting aromatic mercury salt may be easily purified. My novel compounds may also be prepared by employing a soluble aromatic mercury salt, for example, the acetate or lactate in a reaction with the acetylamino substituted acid. The aromatic mercury salts formed during the reaction are of a relatively low solubility as compared with the acetylamino substituted acids and with the aromatic mercury salts formed during the reaction. Compounds may also be prepared by reacting an acid derivative, such as an ester or anhydride, with an aromatic mercury hydroxide to form the corresponding aromatic mercury salt. Any of these general methods may be employed in producing the compounds comprising this invention. In any of these methods, the substituted acetylamino group or groups do not enter into the reaction. The structure of the compounds remains the same except for the replacement of the acidic hydrogen or hydrogens by the aromatic mercury group or groups.

Any inert liquid may be used as the medium for carrying out the reaction, inasmuch as its only function is to bring the reacting components together. Water is convenient to use because of its availability. Other solvents are equally as satisfactory, such as alcohol, acetone, benzol, any other inert organic solvent or mixtures of any of these materials with each other or with water. Alcohol is convenient to use because the reacting components are relatively more soluble therein and smaller quantities of solution are necessary for the preparation of a given amount of the product.

The process may be carried out at any temperature, for example, room temperature and it is not dependent upon the use of an elevated temperature. In most instances I find, however, that the use of heat facilitates the solution of reacting components and permits the use of solutions of greater concentration.

The reacting materials are generally employed in substantially theoretical quantities. In some cases, if desired, approximately 10% excess of the acid may be employed in order to insure complete conversion of the aromatic mercury compound.

If the acid employed is a polybasic acid, one or more, including all of the acidic hydrogens may be replaced by the aromatic mercury radical. The number of hydrogens replaced is dependent upon the amounts of the reacting components. If less than all of the acidic hydrogens are replaced, the corresponding acid salts will be formed.

Mixed salts in which the acidic hydrogens are replaced by different radicals may be prepared and in the case of polybasic acids containing three or more acidic hydrogen atoms, mixed acid salts may be prepared. Mixed salts may be prepared in which different aromatic mercury radicals replace the acidic hydrogen, but the mixed salts may have any positive radical, in particular, alkali metals, attached to the acid radical along with the aromatic mercury radical. Compounds of the latter type may be prepared by reacting an alkali metal acid salt of an aetylamino acid with the aromatic mercury compound, or an alkali metal base may be reacted with the acid along with the aromatic mercury compound.

The following examples are given as illustrative of the preferred method of preparing the compounds and as illustrative of representative organic mercury compounds falling within the generic class heretofore described as constituting my invention:

*Example I*

10.74 grams of acetyl-anthranilic acid (o-acetylamino benzoic acid) is dissolved in 50 cc. of alcohol and to the solution is added 17.64 grams of phenylmercury hydroxide dissolved in 500 cc. of alcohol. The mixture of the two solutions produces a white precipitate. The mixture is allowed to stand for several hours and grayish white crystals separate. These are removed by filtration and recrystallized from alcohol. The product has a melting point of 216° C. and is the compound phenylmercury acetyl anthranilate.

*Example II*

10.74 grams of m-acetylamino benzoic acid is dissolved in 50 cc. of alcohol and to this solution is added 500 cc. of alcohol in which is dissolved 17.64 grams of phenylmercury hydroxide. The solution is concentrated to one-half its original volume and crystals separate. The mixture is filtered and the precipitate is recrystallized from alcohol. The product comprises light brown crystals which have a melting point of 190.5–191° C.; the product is the compound phenylmercury m-acetylamino benzoate.

*Example III*

10.74 grams of p-acetylamino benzoic acid is dissolved in 50 cc. of alcohol and to the solution is added 17.64 grams of phenylmercury hydroxide dissolved in 300 cc. of alcohol. The solution is concentrated to one-half its original volume and light brown shiny crystals precipitate. These are removed by filtration and recrystallized from alcohol. The product has a melting point of 191.5–192° C. and is the compound phenylmercury p-acetylamino benzoate.

*Example IV*

13.74 grams of acetylamino naphthoic acid is dissolved in 200 cc. of alcohol. To the solution is added 500 cc. of alcohol containing 17.64 grams of phenylmercury hydroxide. The material is concentrated to one-half its original volume and crystals separate which are removed by filtration and are washed with alcohol. The product is recrystallized from alcohol and forms brownish shining crystals; it has a melting point of 204–206° C. and is the compound phenylmercury acetylamino naphthoate.

*Example V*

5.22 grams of acetyl asparagine (acetylamino succinamic acid) is dissolved in 100 cc. of alcohol and filtered into 500 cc. of an alcoholic solution containing 8.82 grams of phenylmercury hydroxide. The solution is concentrated to three-fourths of its original volume and set aside and allowed to stand. A white crystalline mass separates which is removed by filtration, washed well with alcohol, and dried. It is then recrystallized from alcohol. Upon heating the material it decomposes at 151° C.; it is the compound phenylmercury acetylamino succinamate.

*Example VI*

17.64 grams of phenylmercury hydroxide is dissolved in 500 cc. of alcohol and to this solution is added 10.38 grams of a-acetylamino caproic acid dissolved in 200 cc. of alcohol. The material is concentrated to a small volume and a reddish oil separates. This is treated with 200 cc. of alcohol, heated to boiling, and allowed to cool. The supernatant liquid is decanted and white crystals separate therefrom. The product has a melting point of 138° C. and is the compound phenylmercury a-acetylamino caproate.

*Example VII*

12.48 grams of p-acetylamino phenyl glycine (p-acetylamino phenyl aminoacetic acid) is dissolved in 300 cc. of alcohol and added to 17.64 grams of phenylmercury hydroxide dissolved in 500 cc. of alcohol. No precipitate forms on the addition and the solution is filtered and concentrated to three-fourths of its original volume. Grayish nodules separate which are removed by filtration, washed, and recrystallized from alcohol. The product decomposed at 171° C., and is the compound phenylmercury p-acetylamino phenyl aminoacetate.

*Example VIII*

29.40 grams of phenylmercury hydroxide is added to 500 cc. of alcohol. When the solution is complete, the solution is filtered and to the filtrate is added 10.25 grams of 3-acetylamino phthalic anhydride. The mixture is refluxed on a steam bath and allowed to cool. The precipitate which forms is separated by filtration and recrystallized from alcohol. It has a melting point of 243–244° C., and is the compound diphenylmercury 3-acetylamino phthalate.

*Example IX*

17.64 grams of phenylmercury hydroxide is dissolved in 500 cc. of alcohol and to the solution is added an alcoholic solution containing 14.16 grams of 3, 5-diacetylamino benzoic acid. The mixture is concentrated and a blackish gray precipitate separates which is recrystallized from alcohol to yield light yellow crystals which do not melt when heated up to 220° C.; the product is the compound phenylmercury 3, 5-diacetylamino benzoate.

The diacetylamino benzoic acid may be prepared, if desired, by treating 16.02 grams of diacetylamino benzoic acid dihydrochloride with 4.8 grams of sodium hydroxide in order to neutralize the two hydrochloride groups.

*Example X*

17.58 grams of 2, 4, 6-triacetylamino benzoic acid is dissolved in 200 cc. of alcohol. The solution is then added to 17.64 grams of phenylmercury hydroxide dissolved in 500 cc. of alcohol. The solution is concentrated and a light yellow crystalline material which separates is removed and recrystallized from alcohol. It has a melting point of 177–178° C. and is the compound phenylmercury 2, 4, 6-triacetylamino benzoate.

From the description of the specific examples, it will be readily apparent to one skilled in the art how other members of the above identified group may be reacted with an aromatic mercury compound to produce the other mercury compounds of analogous structure which are within the scope of my invention.

The compounds produced as above described are characterized by extraordinarily high potency as antiseptics and germicides. Tests in accordance with Circular 198, of the U. S. Dept. of Agriculture, described as F. D. A. method clearly indicate this excellence.

Thus, after an exposure of 15 minutes aqueous solutions of phenylmercury acetyl anthranilate and phenylmercury 2, 4, 6-triacetylamino benzoate killed standard cultures of *Eberthella typhi* (typhoid bacillus) at 37° C. in dilutions as great as 1:100,000 and 1:110,000 respectively. When tested against *Staphylococcus aureus* by the same method and at the same temperature the latter compound killed this organism after a 15 minute exposure in a dilution of 1:20,000.

In addition to their germicidal properties, all of these compounds are characterized by relatively low toxicity. Because of these properties it is possible to use them in extreme dilutions and in many situations where known germicides, because of toxic or other undesirable properties, cannot be employed. They may be used externally and locally and in some cases administered internally with satisfactory results from the germicidal standpoint and without harmful effect.

The compounds retain their germicidal activity when incorporated in soap and various menstrums employed in preparing germicidal compositions.

When these new compounds are to be used directly as germicides they may be employed in aqueous or other solutions or they may be formed into various preparations such as mouth washes, tooth pastes, soaps, ointments, etc.

I claim:

1. An organic mercury compound having the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents an acetylamino substituted carboxylic acid radical that is linked to the RHg group through replacement of carboxyl hydrogen; and in which $x$ represents the number of RHg groups in the compound and is an integer of at least one and not more than the number of carboxyl groups in the radical $R_1$.

2. An organic mercury compounds having the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents an acetylamino substituted aromatic carboxylic acid radical that is linked to the RHg group through replacement of carboxyl hydrogen; and in which $x$ represents the number of RHg groups in the compound and is an integer of at least one and not more than the number of carboxyl groups in the radical $R_1$.

3. An organic mercury compound having the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents an acetylamino substituted mononuclear aromatic carboxylic acid radical that is linked to the RHg group through replacement of carboxyl hydrogen; and in which $x$ represents the number of RHg groups in the compound and is an integer of at least one and not more than the number of carboxyl groups in the radical $R_1$.

4. An organic mercury compound having the general formula $RHg.R_1$, in which R represents an aromatic structure to a carbon atom of which the mercury is directly attached and in which none of the carbon atoms has direct linkage with any element other than hydrogen, carbon and mercury; and in which $R_1$ represents an acetylamino substituted benzoic acid radical that is linked to the RHg group through replacement of carboxyl hydrogen.

5. An organic mercury compound having the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents an acetylamino substituted aliphatic carboxylic acid radical that is linked to the RHg group through replacement of carboxyl hydrogen; and in which $x$ represents the number of RHg groups in the compound and is an integer of at least one and not more than the number of carboxyl groups in the radical $R_1$.

6. An organic mercury compound having the general formula $(C_6H_5Hg)_x.R_1$, in which $R_1$ represents an acetylamino substituted carboxylic acid radical that is linked to the $C_6H_5Hg$ group through replacement of carboxyl hydrogen; and in which $x$ represents the number of $C_6H_5Hg$ groups in the compound and is an integer of at least one and not more than the number of carboxyl groups in the radical $R_1$.

7. An organic mercury compound having the general formula $(C_6H_5Hg)_x.R_1$ in which $R_1$ represents an acetylamino substituted aromatic carboxylic acid radical that is linked to the $C_6H_5Hg$ group through replacement of carboxyl hydrogen; and in which $x$ represents the number of $C_6H_5Hg$ groups in the compound and is an integer of at least one and not more than the number of carboxyl groups in the radical $R_1$.

8. An organic mercury compound having the general formula $(C_6H_5Hg)_x.R_1$, in which $R_1$ represents an acetylamino substituted mononuclear aromatic carboxylic acid radical that is linked to the $C_6H_5Hg$ group through the replacement of carboxyl hydrogen; and in which $x$ represents the number of $C_6H_5Hg$ groups in the compound and is an integer of at least one and not more than the number of carboxyl groups in the radical $R_1$.

9. An organic mercury compound having the general formula $C_6H_5Hg.R_1$, in which $R_1$ represents an acetylamino substituted benzoic acid radical that is linked to the $C_6H_5Hg$ group through the replacement of carboxyl hydrogen.

10. An organic mercury compound having the general formula $C_6H_5Hg.R_1$, in which $R_1$ represents an acetylamino substituted aliphatic carboxylic acid radical that is linked to the $C_6H_5Hg$ group through the replacement of carboxyl hydrogen.

11. Phenylmercury acetyl anthranilate.

12. Phenylmercury 2,4,6-triacetylamino benzoate.

13. Phenylmercury acetylamino succinamate.

CARL N. ANDERSEN.